March 18, 1930.                B. L. CONLEY                 1,750,745
                               UNIVERSAL MOTOR
                             Filed Dec. 15, 1924

Inventor
Brooks L. Conley
By H. S. Demaree
   Attorney

Patented Mar. 18, 1930

1,750,745

UNITED STATES PATENT OFFICE

BROOKS L. CONLEY, OF CANTON, OHIO, ASSIGNOR TO THE HOOVER COMPANY, A CORPORATION OF OHIO

UNIVERSAL MOTOR

Application filed December 15, 1924. Serial No. 755,829.

This invention relates in general to electric motors and more particularly to electric motors adapted for operation on either alternating or direct current.

A universal motor of the usual type does not ordinarily operate as well on alternating current as it does on direct current. When such a motor, operating at a certain speed on direct current, has its energy supply changed to alternating current of the same voltage, its speed decreases, and commutating conditions become worse. One cause of the changed commutating conditions, is that the coils undergoing commutation have induced in them an E. M. F. due to the "transformer action" between these coils and the field.

One well known method of increasing the speed of a commutator type motor is to decrease the field flux. Then, when a universal motor has its energy supply changed from direct to alternating current, a decrease in field flux is beneficial, as it causes the motor to run at a higher speed than it would without such flux decrease, and commutation is better with decreased field flux than if there is no such decrease. If the field flux is sufficiently decreased when the energy supply is changed from direct to alternating current, the speed may be maintained at the same value as when operating on direct current.

An object of my invention is to provide means for automatically changing the field flux of a motor when its energy supply is changed from alternating to direct current or vice versa.

Another object of my invention is to provide means whereby the field flux is automatically adjusted when the energy supply is changed from direct to alternating current, or vice versa, giving a lower value of field flux on alternating current than on direct current, thus improving the operation of the motor by lessening the difference in speed between alternating and direct current operation, and providing better commutating conditions on alternating current. By proper proportioning, the alternating and direct current speed can be made the same for the same voltage and load conditions.

My invention consists of a commutator type motor having one or more closed coils or loops so placed that a portion of the field flux threads them when the motor operates on direct current, the closed coils or loops themselves causing a smaller portion of the field flux to thread them when the motor operates on alternating current than when it operates on direct current.

In the accompanying drawings wherein I have illustrated an embodiment of my invention;

Figure 1:
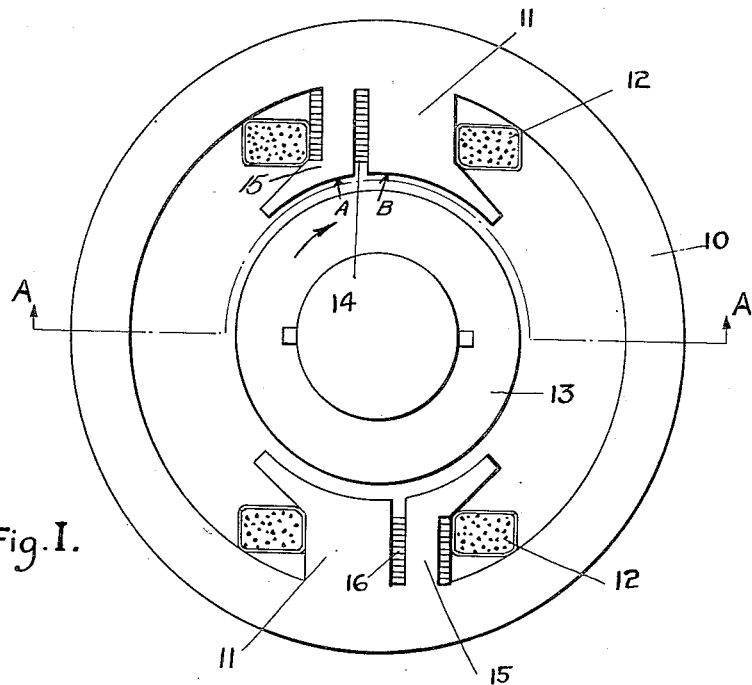
Figure 1 is a plan view looking in the direction of the axis of the motor with parts shown in section.
Figure 2:
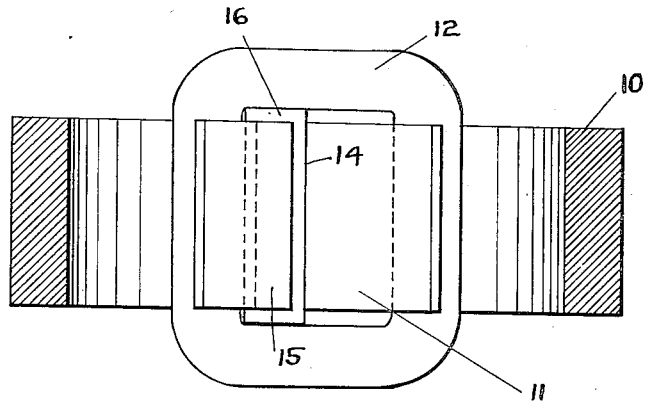
Fig. 2 is an axial section taken along line A—A on Fig. 1 looking in the direction of the arrows with the armature removed.

In the embodiment of my invention illustrated in the drawings, the magnetic circuit of the motor is formed by the field core 10 made in this instance with two projecting poles 11. It is to be understood, however, that I am not limited to any particular arrangement or number of poles and that two are shown in the present drawings merely for ease of illustration and description.

Around each of the poles is placed a field coil 12 of ordinary construction such as is shown in section in Fig. 1. An armature of the ordinary commutator type is indicated at 13.

Figure 3:
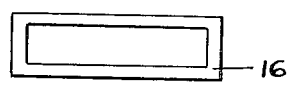
Fig. 3 is a detailed view of a closed coil.

In order to have a portion of the field flux thread a closed coil or loop, I may place such a coil or loop anywhere in the magnetic circuit. In the present construction disclosing the preferred embodiment I have formed a slot 14 extending axially in the face of each of the projecting poles 11 which separates the forward tip thereof from the main body of the pole. The direction of rotation of the armature 13 is clockwise, as indicated by the arrow. Surrounding the portion 15 of each projecting pole 11 defined by the slot 14 and one of the side faces, I have placed a closed coil or loop 16 of one turn, which for ease of assembly and to eliminate joints is composed of a stack of punchings from thin sheet copper, such as are illustrated by Fig. 3. It is to be understood that my invention is not limited to closed coils of one turn, as any number of turns may be used effectively.

In the operation of the motor, the closed loops 16 will have no effect whatever when the energy is supplied in the form of direct current as the magnetic flux will pass thru the portions 15 of the magnetic circuit as readily as through the closed loops were absent and the magnetic center of the pole would be at some point in the forward tip, as indicated by the character A in Figure 1.

However, when the motor is operating on alternating current, a small amount of flux through the loops 16 causes current to flow in them in such directions as to neutralize the effect of some of the field turns on the portions 15 of the path of the magnetic circuit. As the loops 16 are of low resistance, only a small value of flux is needed to cause almost complete neutralization of the field magnetomotive force acting on those portions of the magnetic circuit within the loops 16.

The result is that the value of the flux thru the portion 15 is much smaller when operating on alternating current than on direct current. The effect is similar to that of a motor having a higher magnetic reluctance when operating on alternating current than when operating on direct current, because the path of the flux is more restricted on alternating current, and produces a motor in which both the universal characteristics and the commutation is improved by the application of the closed coils or loops. A still further effect of the incorporation of the coil 16 which restricts the flux in the portion 15 is the shift in the magnetic center of the pole from the point A, at which point it would remain in the operation of the machine, on either A. C. or D. C. in the absence of the coils, to the point indicated by the character B. This shift of the magnetic center from A to B has the same effect as would be obtained by shifting the brushes of the machine in a direction opposite to the direction of rotation which would result in an increase in speed of the machine.

The copper losses in the loops 16 can be made very low my making them of sufficient cross-section because the maximum current that can be induced in them is not quite equal to the current required to neutralize completely the exciting magnetomotive force acting on the portions of the magnetic circuit enclosed by the loops 16. This current being limited, the losses can be controlled, and a motor produced which has a satisfactory efficiency.

What I claim as my invention is:—

1. In a motor operable on either alternating or direct current, the combination of a stator arranged to form a magnetic circuit including a pole having leading and lagging pole tips, and an endless electrically conductive loop arranged to encircle a portion only of the sectional area of said magnetic circuit but including the leading tip of the field pole and accordingly be inductively energized through the magnetic flux variations of said magnetic circuit, said loop being unconnected with respect to all other sources of electrical energy and arranged to embody an electrical resistance gauged to balance said induced energy to attain a current value whereby the counter magnetomotive force created thereby will effect the speed of the motor to correspond with that speed which is normal when the motor is operating merely under the influence of direct current.

2. In a motor operable on either alternating or direct current, the combination of a stator arranged to form a magnetic circuit including a pole having leading and lagging tips, and an endless electrically conductive loop arranged to encircle a portion only of the sectional area of said magnetic circuit but including the leading pole tip and accordingly be inductively energized through the magnetic flux variations of said magnetic circuit, said loop being unconnected with respect to all other sources of electrical energy and arranged to embody an electrical resistance gauged to balance said induced energy to attain a current value whereby the counter magnetomotive force created thereby will effect the speed of the motor to a predetermined extent relative to that speed which is normal when the motor is operating merely under the influence of direct current.

3. In a motor operable on either alternating or direct current, an armature, a field pole, a leading tip on said field pole and a short-circuited coil encircling a portion only of said pole and cut by the magnetic flux through said leading tip and said portion, the flux through said tip being unaffected by the presence of said coil when the motor is operated on direct current but being decreased thereby when the motor is operated on alternating current.

4. In a motor operable on either alternating or direct current, an armature, a field pole, a leading tip on said field pole and means which function only when the motor is operated on alternating current to reduce the magnetic flux in said field pole and shift the magnetic center of said field pole from the leading tip in the direction of rotation of said armature.

5. In a motor operable on either alternating or direct current, an armature, a field pole, a leading tip on said field pole and means to maintain the same speed of rotation of said armature on alternating as on direct current through the reduction of the total field flux and the shifting of the magnetic center of said field pole on alternating current operation.

6. In a motor operable on either alternating or direct current, an armature, a field pole, a leading tip on said field pole and means to maintain the same speed of rotation of said armature on alternating as on direct current through the reduction of the total field flux and the shifting of the magnetic center of said field pole on alternating current operation, said means comprising a short-circuited coil adapted to be cut by the flux through said leading pole tip.

7. In a motor operable on alternating or direct current, a magnetic circuit including a field pole having leading and lagging tips, said field pole being divided into a plurality of spaced parallel magnetic flux paths one of which includes said leading pole tip and means to increase the reluctance of said path including said leading pole tip when the motor is using alternating current, said means comprising a short-circuited coil encircling said path.

Signed at Canton, in the county of Stark and State of Ohio, this 7th day of November, A. D. 1924.

BROOKS L. CONLEY.